R. E. HELLMUND.
METHOD OF AND APPARATUS FOR EXCITING PHASE CONVERTERS.
APPLICATION FILED AUG. 7, 1916.

1,376,430.

Patented May 3, 1921.

WITNESSES:

INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

METHOD OF AND APPARATUS FOR EXCITING PHASE-CONVERTERS.

1,376,430.   Specification of Letters Patent.   Patented May 3, 1921.

Application filed August 7, 1916. Serial No. 113,455.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Methods of and Apparatus for Exciting Phase-Converters, of which the following is a specification.

My invention relates to regulating apparatus for phase converters of the rotary type, and it has for its object to provide means whereby the different component voltages, in apparatus of the character designated, may be automatically regulated with respect to each other throughout wide variations in load.

Figure 1:
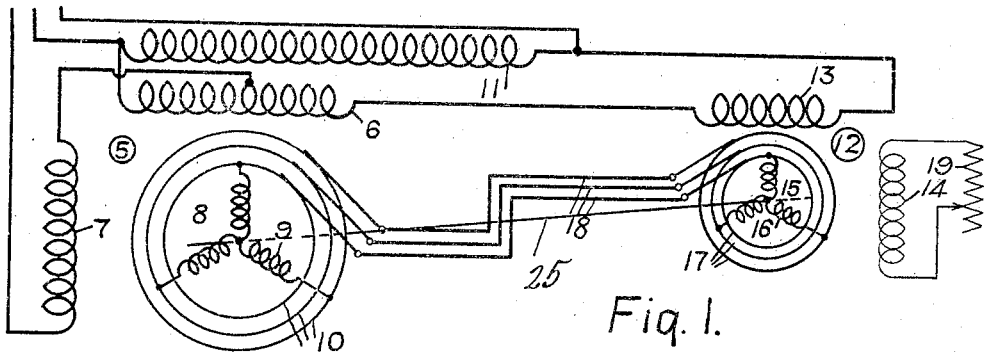
Figure 2:
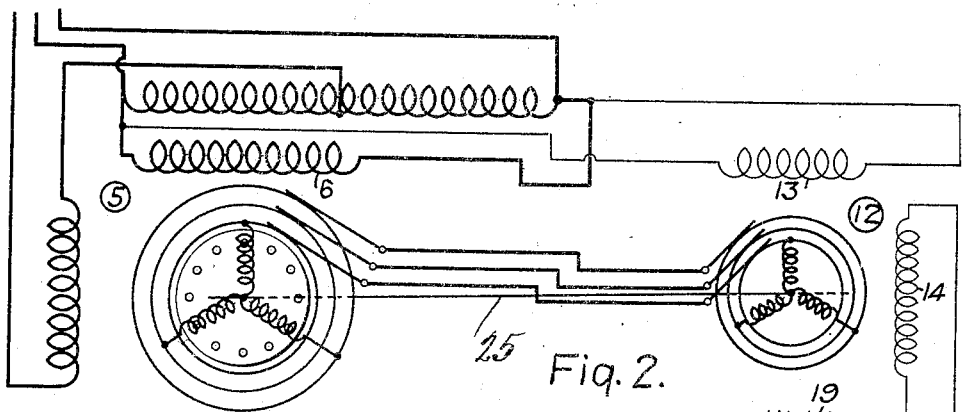
Figure 3:
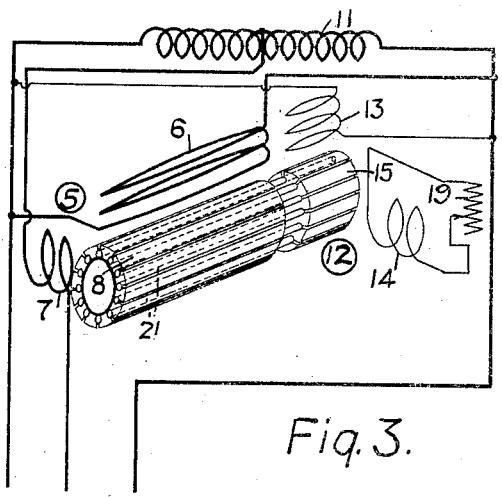
Figure 4:
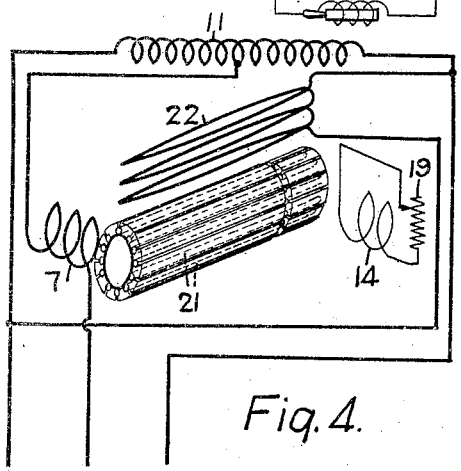

In the accompanying drawing, Figure 1 is a diagrammatic view of a phase-converter, together with associated apparatus, embodying one form of my invention; and Figs. 2, 3 and 4 are diagrammatic views of modifications of the system shown in Fig. 1.

In the operation of phase-converters, such, for example, as those employed for deriving three-phase current from a single-phase source or for balancing unbalanced polyphase systems, it is a well known fact that, with an increase of load, there is a tendency for the secondary induced voltage to fall off because of the drops in the stator and rotor circuits. This is an undesirable condition as it promotes unbalancing in the polyphase distributing system, with resultant unsatisfactory operation of polyphase apparatus connected thereto.

By my invention, I provide means whereby an extraneous voltage is introduced into the rotor circuits for forcing the load current therethrough. By suitable adjustment of said auxiliary voltage, the drop across the rotary terminals may be suitably compensated for and I may, in fact, by a further increase in said auxiliary voltage, compensate for the voltage drops in the primary winding itself and in associated apparatus.

It has been found that the load currents in the rotor circuits of a phase-converter are of twice the frequency of the supply and it is therefore necessary that the above-mentioned auxiliary, compensating voltage be of double frequency in order to properly perform its function.

In my copending application, Serial No. 108,567, filed July 11, 1916, I disclose means whereby the desired double-frequency exciting currents may be produced by exciting machines of the commutator type. The exciting current thus produced is of the same magnitude when acting in conjunction with the primary winding of the phase converter as when acting in conjunction with the tertiary or inducing winding thereof; that is to say, a like amount of voltage boost is imparted to each winding. This is an undesirable condition, as the voltage of the primary winding drops off with load only, on account of the drops in the winding itself and in the current leads thereto. The voltage of the tertiary winding of the phase-converter, on the other hand, falls off to a much more pronounced degree, with an increase in load, as there is the cumulative effect of the drop in the primary winding, the drops in the rotor or secondary windings and, finally, the drop in the tertiary winding itself. It follows, therefore, that, in order to obtain an ideal condition of operation in the phase converter, the exciting current supplied to the secondary winding should be more pronounced in its action when a phase of the secondary winding is inductively interlinked with the tertiary stator winding than when said secondary phase is inductively interlinked with the primary stator winding. By supplying the secondary winding with double-frequency alternating current, alternate waves of which differ in magnitude from the remaining waves and, by properly adjusting the phase relation of said exciting current, the aforementioned desirable exciting operation may be produced.

It is the object of the present invention to provide a machine which shall produce exciting current of the desired special characteristics, and said machine preferably takes the form of an auxiliary phase converter operating from the same source as the main phase converter, said auxiliary machine having its secondary winding connected to the secondary winding of the main machine and having its tertiary stator winding short-circuited through an adjustable resistor. The method of operation of said machine will be discussed in detail hereinafter.

In Fig. 1 of the drawing, I show a phase converter of the T-connected rotary type at 5, said machine comprising a primary stator winding 6, a tertiary stator winding 7 and a rotor 8 provided with a three-phase secondary winding 9. The terminals of the secondary winding 9 are connected to suitable slip rings 10. Energy for the operation of the phase-converter 5 is derived from any suitable source, such, for example, as a transformer winding 11. An auxiliary machine 12, similar in its general aspect to a phase-converter, comprises a primary stator winding 13, a tertiary stator winding 14 and a rotor 15 provided with a three-phase secondary winding 16. The terminals of the secondary winding 16 are connected to suitable slip rings 17, and the slip rings 17 are connected to the slip rings 10 of the main machine through suitable brushes and connecting leads 18. The tertiary winding 14 of the machine 12 is short-circuited through an adjustable resistor 19. The primary winding 13 is connected to be energized from the source 11 as, for example, by being connected in series with the primary winding 6. The machines 5 and 12 may be mechanically coupled as by a shaft 25.

Having thus described the arrangement of a system embodying my invention, the operation is as follows. It has been shown that the current flowing in the secondary winding of a phase converter and producing rotation of the armature thereof is a current of slip frequency, similar to the secondary current of the ordinary induction motor. Said current is produced by the slip voltage and an increase in the driving torque necessary for the converter rotor increases the slip and, consequently, increases the slip voltage. The main working currents, however, that is to say, those currents which are induced from the stator primary winding and, in turn, induce the output current in the tertiary stator winding are, as above pointed out, of double frequency and are therefore clearly not produced by the slip voltage and are but little affected by slight changes in the slip. The main working currents are produced by the fluctuations of the rotor flux as a phase winding of the secondary passes from inductive relation with one primary phase to inductive relation with another or with a tertiary phase. The double-frequency working currents in the rotor 15 are therefore produced by the fluctuations in the flux interlinked with the respective phases of the winding 16, as each of said phases passes from inductive relation with the winding 13 to inductive relation with the winding 14, and so on. By varying the effective resistance of the resistor 19, the flux of the winding 14 may be widely varied in amount and may be made much different from the flux of the winding 13. There is, therefore, a great change or fluctuation in flux in a phase of the winding 16 when passing from one to the other of the stator windings, and said abrupt flux change produces a relatively high double-frequency electromotive force in the winding 16. Said electromotive force is of the character hereinbefore described, that is, alternate waves are of one magnitude and the remaining waves are of a different magnitude and, by proper adjustment of the connections, said rotor currents from the machine 12 may be supplied to the rotor winding 9 to produce any desirable compounding characteristic in the machine 5.

The system of Fig. 2 is, in general, similar to that of Fig. 1 but the primary windings 6 and 13 of the two machines are connected in parallel with each other rather than in series and, furthermore, the tertiary winding 14 of the machine 12 is short circuited, not only through a resistor 19 but also through an adjustable reactor 20. By this means, the exciting currents supplied by the machine 12 may be adjusted, not only in magnitude but also in phase.

The slip rings 10 and 17, together with their associated brushes, are quite expensive and require frequent inspection and care for their proper operation. It is desirable, therefore, to eliminate them, if possible, and I show in Fig. 3, a system wherein this has been done. The machine 5 is provided with primary and tertiary stator windings 6 and 7, as before, but the rotor 8 is provided with a squirrel-cage winding 21, such as is commonly used in phase-converters. The machine 12 is combined with the machine 5 in that the rotor 15 is mounted coaxially with the rotor 8 and, in fact, may be formed integral therewith. The squirrel-cage winding 21 of the rotor 8 is of such length as to also inclose the rotor 15. The primary and tertiary stator windings 13 and 14 of the machine 12 are mounted to operate upon the rotor 15, as before.

The operation of the system of Fig. 3 is similar to that heretofore described. Appropriate double-frequency exciting current is generated in that portion of the squirrel-cage winding 21 which lies upon the rotor 15 and is subject to the influence of the windings 13 and 14, and said exciting current flows through the main portion of the squirrel-cage winding 21, producing in the machine 5 the desired compounding characteristic.

The primary windings 6 and 13 of the two machines may, in certain instances, be consolidated. A system of this character is shown in Fig. 4, a single primary stator winding 22 acting upon the entire length of the squirrel-cage winding 21.

While I have shown my invention in a plurality of forms, it will be obvious to those skilled in the art that it is susceptible of other changes and modifications, without departing from the spirit thereof and I desire, therefore, that only such limitations shall be placed thereupon as are imposed by the prior art or as are set forth in the appended claims.

I claim as my invention:

1. The combination with a main rotary phase-converter, of an alternating-current source of definite frequency connected thereto, and an auxiliary single-phase phase-converter also connected to said source and arranged to act as a source of double-frequency exciting current for said main converter.

2. The combination with a rotary phase-converter, of means for supplying single-phase energy thereto, an auxiliary single-phase phase-converter, connections for supplying said auxiliary phase-converter with single-phase energy of the frequency of said main supply, and connections for supplying the double-frequency currents induced in the secondary member of said auxiliary machine to the secondary circuits of said main phase-converter.

3. The combination with a rotary phase-converter, of a single-phase, alternating-current supply connected thereto, an auxiliary phase-converter supplied from a single-phase source of like frequency to said main converter source and arranged to operate as a source of double-frequency, exciting current for said main converter, and means for causing the amplitude of alternate cycles of said double-frequency exciting circuit to be of different magnitude from the remaining cycles.

4. The combination with a source of alternating current, of means for deriving alternating current therefrom of double the frequency thereof, and means for causing the amplitude of alternate cycles of said double-frequency current to differ from the amplitude of the remaining cycles.

5. The combination with a source of alternating currents, of a phase-converter of the rotary type connected thereto, means for deriving double-frequency load currents from the secondary thereof, and means for short-circuiting the tertiary winding of said converter.

6. The combination with a source of alternating currents, of a phase-converter of the rotary type connected thereto, means for deriving double-frequency load currents from the secondary thereof, a resistor, and means for joining the terminals of the tertiary winding of said converter through said resistor.

7. The combination with a source of alternating currents, of a phase-converter of the rotary type connected thereto, means for deriving double-frequency load currents from the secondary thereof, an adjustable resistor, and means for joining the terminals of the tertiary winding of said converter through said resistor.

8. The combination with a source of alternating current, of a polyphase load circuit, a phase-converter connected to said source and supplying current to said load circuit, and means for supplying the secondary winding of said converter with exciting current the effect of which is more pronounced in combination with the tertiary winding of said converter than in combination with the primary winding thereof.

9. The combination with a source of alternating currents, of a phase-converter of the rotary type connected thereto, means for deriving double-frequency load currents from the secondary member thereof, a resistor and a reactor, and means for joining the terminals of the tertiary winding of said phase-converter therethrough.

10. The combination with a source of alternating currents, of a phase-converter of the rotary type connected thereto, means for deriving double-frequency load currents from the secondary winding thereof, an adjustable resistor, an adjustable reactor, and means for joining the terminals of the tertiary winding of said phase-converter therethrough.

11. The combination with a source of alternating current, of a phase-converter of the rotary type connected to be energized therefrom, a load circuit of twice the frequency of said source, and connections from the secondary circuits of said converter to said load circuit, whereby said load circuit is energized from said source.

12. The combination with a main induction machine having a polyphase primary winding and a secondary winding, of an auxiliary induction machine having a primary winding and a secondary winding, said last-mentioned primary winding being adapted to receive an unbalanced single-phase component of excitation, and said last-mentioned secondary winding being electrically connected to said first-mentioned secondary winding to supply a super-frequency electromotive force thereto.

13. The combination with a main induction machine having a polyphase primary winding and a secondary winding, of an auxiliary induction machine mechanically connected to said main machine and having a primary winding and a secondary winding, said last-mentioned primary winding being adapted to receive an unbalanced single-phase component of excitation, and said last-mentioned secondary winding being electrically connected to said first-mentioned secondary winding to supply a super-frequency electromotive force thereto.

14. The combination with a main inductive machine having a polyphase primary winding and a secondary winding, of an auxiliary induction machine also having a primary winding and a secondary winding, means for producing in said last-mentioned primary winding an unbalanced single-phase component of excitation, means for electrically connecting said last-mentioned secondary winding to said first-mentioned secondary winding to supply a super-frequency electromotive force thereto, and means for varying the magnitude of said impressed electromotive force.

15. The combination with a main induction machine having a polyphase primary winding and a secondary winding, of an auxiliary induction machine mechanically connected to said main machine and having a primary winding and a secondary winding, means for producing in said last-mentioned primary winding an unbalanced single-phase component of excitation, means for electrically connecting said last-mentioned secondary winding to said first-mentioned secondary winding to supply a super-frequency electromotive force thereto, and means for varying the magnitude and phase of said impressed electromotive force.

16. An induction machine aggregate, comprising main and auxiliary primary windings, said main winding being adapted to be connected to a normally unbalanced polyphase system, said auxiliary winding being adapted to receive an unbalanced single-phase component of excitation, and secondary windings including a plurality of circuits each of which is subjected to the influence of the flux produced by both said main and auxiliary primary windings, whereby said circuits receive a super-frequency electromotive force from said auxiliary winding flux.

17. An induction machine aggregate, comprising main and auxiliary primary windings, said main windings being adapted to be connected to a normally unbalanced polyphase system, and secondary windings including a plurality of circuits each of which is subjected to the influence of the flux produced by both said main and auxiliary primary windings, means for producing in said auxiliary primary winding an unbalanced single-phase component of excitation, whereby said secondary circuits receive super-frequency electromotive forces from the fluxes produced by said main and auxiliary primary windings, respectively, and means for varying the relative phase relationship of said super-frequency electromotive forces.

In testimony whereof, I have hereunto subscribed my name this 21st day of July 1916.

RUDOLF E. HELLMUND.